(12) United States Patent
Bala (10) Patent No.: US 6,351,844 B1
(45) Date of Patent: Feb. 26, 2002

(54) METHOD FOR SELECTING ACTIVE CODE TRACES FOR TRANSLATION IN A CACHING DYNAMIC TRANSLATOR

(75) Inventor: Vasanth Bala, Sudbury, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/186,945

(22) Filed: Nov. 5, 1998

(51) Int. Cl.$^7$ ................................................. G06F 9/45
(52) U.S. Cl. .................... 717/4; 717/7; 717/9; 712/209; 712/227
(58) Field of Search .......................... 712/227, 23, 233, 712/244, 209; 717/1, 5, 8, 7, 9, 10, 4; 703/22, 26; 709/331; 710/226

(56) References Cited

U.S. PATENT DOCUMENTS

| | | | | |
|---|---|---|---|---|
| 5,815,720 A | * | 9/1998 | Buzbee ........................... | 717/9 |
| 5,909,578 A | * | 6/1999 | Buzbee ........................... | 717/4 |
| 5,933,622 A | * | 8/1999 | Buzbee et al. ................ | 703/22 |
| 6,021,275 A | * | 2/2000 | Horwat ........................... | 717/7 |
| 6,091,897 A | * | 7/2000 | Yates et al. .................... | 717/8 |

OTHER PUBLICATIONS

Thomas Ball, James R. Larus "Efficient Path Profiling", Dec. 1996, Micro–29, pp. 1–12.
Thomas M. Conte, Burzin A. Patel, J. Stan Cox "Using Branch Handling Hardware To Support Profile–Driven Optimization", Nov. 1994, Micro–27, pp. 12–21.
U. Holzle "Adaptive Optimization For Self: Reconciling High Performance With Exploratory Programming", PhD Thesis, Stanford University Dept. of Computer Science, Aug. 1994, pp. i–163.

\* cited by examiner

Primary Examiner—Richard L. Ellis (57) ABSTRACT

A method is shown for selecting active, or hot, code traces in an executing program for storage in a code cache. A trace is a sequence of dynamic instructions characterized by a start address and a branch history which allows the trace to be dynamically disassembled. Each trace is terminated by execution of a trace terminating condition which is a backward taken branch, an indirect branch, or a branch whose execution causes the branch history for the trace to reach a predetermined limit. As each trace is generated by the executing program, it is loaded into a buffer for processing. When the buffer is full, a counter corresponding to the start address of each trace is incremented. When the count for a start address exceeds a threshold, then the start address is marked as being hot. Each hot trace is then checked to see if the next trace in the buffer shares the same start address, in which case the hot trace is cyclic. If the start address of the next trace is not the same as the hot trace, then the traces in the buffer are checked to see they form a larger cycle of execution. If the traces subsequent to the hot trace are not hot themselves and are followed by a trace having the same start address as the hot trace, then their branch histories are companded with the branch history of the hot trace to form a cyclic trace. The cyclic traces are then disassembled and the instructions executed in the trace are stored in a code cache.

10 Claims, 10 Drawing Sheets

METHOD FOR SELECTING ACTIVE CODE TRACES FOR TRANSLATION IN A CACHING DYNAMIC TRANSLATOR

BACKGROUND OF THE INVENTION

1. Field of the Invention

This invention relates generally to the selection of code regions for caching in caching dynamic translator.

2. Description of the Related Art

Dynamic translators are used for directly executing non-native program binaries on a processor. Dynamic translators operate by translating each word of the non-native code into a corresponding word or words of native code for execution by the processor. Dynamic translators are related to binary translators, just-in-time compilers and runtime translators. Translation is generally performed at the time the non-native code word is executed. However, there is a significant level of overhead in performing the translation from non-native to native code. Similar methods can be applied to the optimization of native binary code where optimized native code is generated and executed in place of non-optimized native code.

In order to improve performance, native code translations of frequently executed regions are typically kept in a translated code cache. Subsequent execution references to the non-native code words of these translated regions then execute in the corresponding region of the translated code cache, thus avoiding the overhead of emulation.

Figure 1:
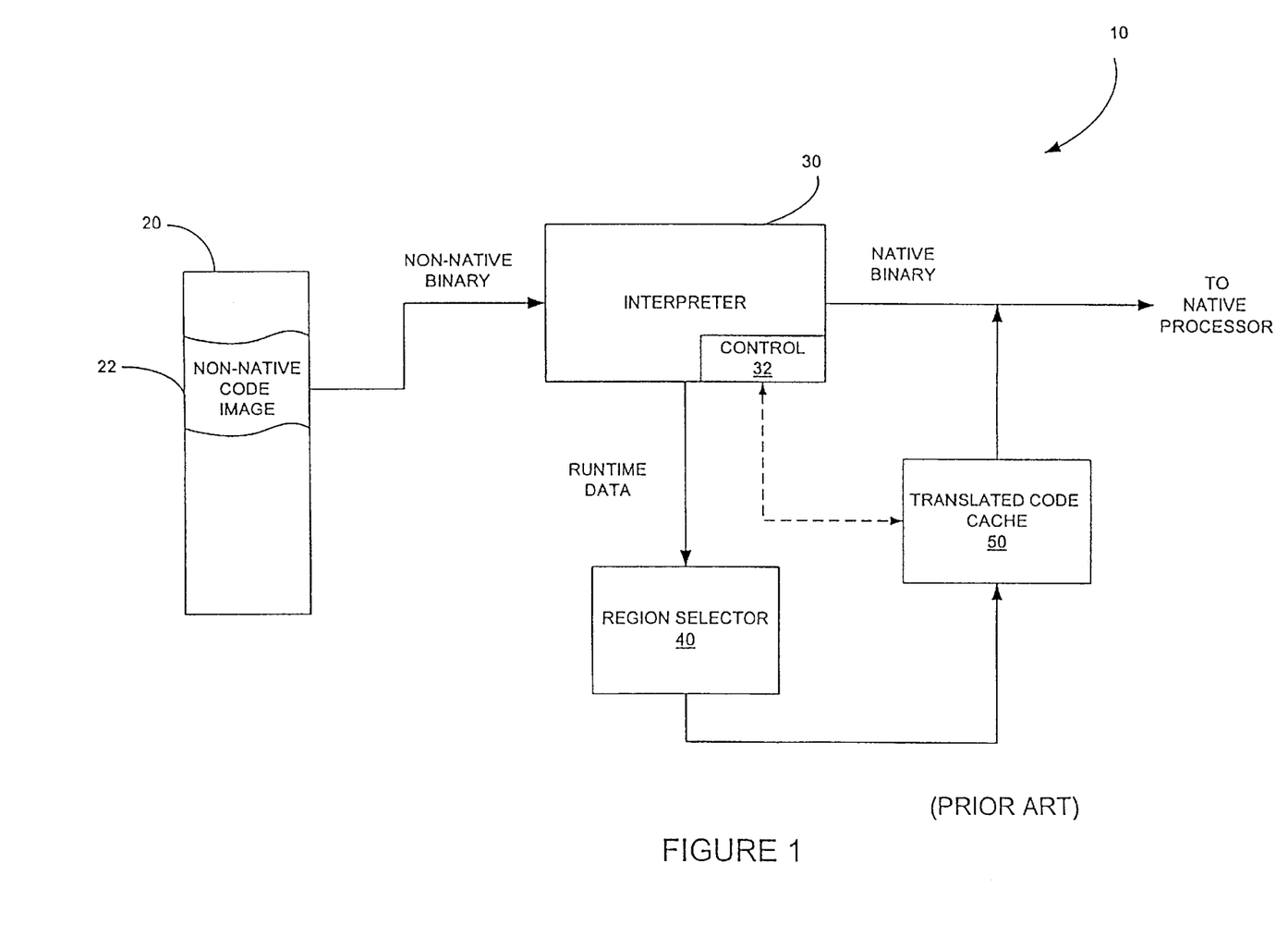
FIG. 1 illustrates an architecture for a conventional dynamic translator.
Figure 2:
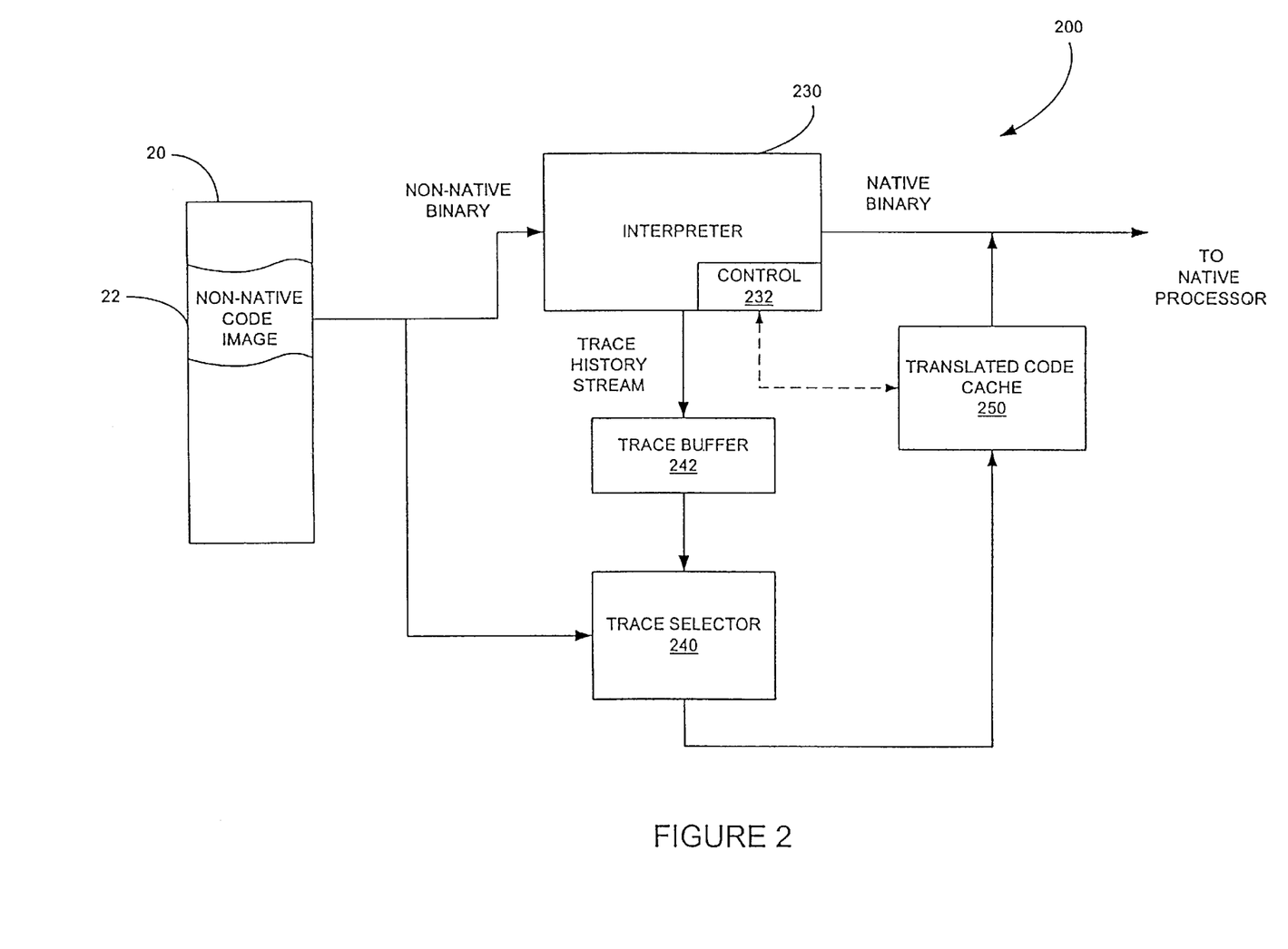
FIG. 2 illustrates an architecture 200 for an embodiment of a dynamic translator according to the present invention.

FIG. 1 illustrates an architecture for an embodiment of a caching dynamic translator 10. A memory image 22 of the non-native code is stored in memory 20. During execution, each word of the non-native code 22 is read out of memory 20 by an interpreter 30 which emulates the non-native binary code on a native processor for execution. Alternatively, the interpreter may read several words from memory, translate them into native code, and then output the translated code to a native processor for execution. In FIGS. 1 and 2, the arrow indicating "native binary" going "to native processor" represents a combination of the execution of the interpreter program with execution of translated code.

The translated native binary code is also typically stored into a translated code cache 50. When control section 32 of interpreter 30 detects a cache hit for an instruction in translated code cache 50, the translated version of the interpreted native binary is output from the cache for execution by the native processor.

A region selector 40 is often included which manages the content of the code cache 50 and determines which segments of translated code remain in the code cache 50. Subsequent references to the non-native code image 22 will execute the corresponding native code in code cache 50 provided that the corresponding native code has not been replaced.

The region selector 40 typically receives runtime profile data from the interpreter 30 which the region selector uses in selecting regions of translated code that are maintained in the translated code cache. Judicious region selection can improve the hit rate in the translated code cache, but at the cost of higher overhead. The tradeoff between hit rate and selection overhead is a critical part of dynamic translator design.

Existing implementations of dynamic translators use either runtime profile data, such as statistical PC sampling or branch profiling, or call invocation counting in order to identify frequently executed regions of the non-native code. The problem with such methods is that it is hard to trigger an action based on execution rate (i.e. how often a region is executed within a certain time interval); it can only be triggered based on execution count (how many times a region has executed thus far). Another problem is that it is difficult to dynamically adjust the degree of profiling done on different program regions because heavy profiling of a very hot region can hurt performance due to the overhead associated with profiling, whereas it may be inconsequential on a cold region.

For example, the SELF system (described by U. Holzle in *"Adaptive optimization for SELF: Reconciling High Performance with Exploratory Programming"*, PhD Thesis, Stanford University Dept. of Computer Science, August 1994) generates unoptimized native code for a procedure upon first invocation of the procedure, with the procedure prologue containing instrumentation to count the number of invocations. If a counter exceeds a threshold, the corresponding routine is flagged as hot (i.e. it has reached an activity threshold) and, in the case of the SELF system, the hot routine is dynamically re-optimized along with other routines in the call chain.

In the SELF system, an exponential decay technique for region selection is used, wherein the system is periodically interrupted and all the counters corresponding to the cached routines are halved. This attempts to convert the counters into measures of invocation rates rather than invocation counts.

The runtime profile of a program is used in dynamic translators to focus analysis on those parts of the executing program where greater performance benefit is likely. A runtime profile is a collection of information indicating the control flow path of a program, i.e. which instructions executed and where branches in the execution took place. Program profiling typically counts the occurrences of an event during a program's execution. The measured event is typically a local portion of a program, such as a routine, line of code or branch. Profile information for a program can consist of simple execution counts or more elaborate metrics gathered from hardware counters within the computer executing the program.

One conventional approach to profiling is to instrument the program code by adding profiling probes to the code. Profiling probes are additional instructions which are used to log the execution of a basic block of code containing the probe.

Instrumentation based methods for gathering profile data tend to be complex and time consuming. Instrumentation of the code can result in a code size explosion due to the added instructions. The additional probe instructions also slow execution of the code and a profiled, or instrumented, version of a program can run substantially slower than the original version. Thus, profiling can represent a significant level of overhead in the execution of a program.

Therefore, the need remains for a method of selecting regions for dynamic translation into a code cache which has limited overhead and increases the time spent executing from the code cache.

SUMMARY OF THE INVENTION

It is, therefore, an object of the invention to provide a method for selecting active code segments in an executing program having low overhead.

Another object of the invention is to enable dynamic optimization of the code while the code is executing.

An embodiment of a method for selecting active code segments in an executing program, according to the present invention, involves creating a branch history entry for a series of executed code segments, wherein each branch history entry includes a start address and branch history value of one of the segments, storing each branch history entry in a trace buffer, and incrementing a counter corresponding to the start address for each branch history entry in the trace buffer responsive to a selection processing signal. The method then calls for identifying as a hot trace each branch history entry having a start address value with a corresponding counter value which exceeds a threshold, translating the program code segment corresponding to each hot trace into a translated code segment, and storing the translated code segment into a translated code cache.

An embodiment of a dynamic translator for executing a non-native program, the translator, according to the present invention, includes an interpreter configured to receive non-native code words from a non-native code image of the non-native program and interpret the non-native code words by executing native code words. The interpreter is also configured to generate branch history data including a start address and a branch history value for each of a series of traces during execution of the non-native program. The interpreter includes a control section configured to output the start address of a currently executing trace and receive a cache hit signal and a cache miss signal, wherein the control section suspends operation of the interpreter responsive to the cache hit signal and continues operation of the interpreter responsive to the cache miss signal, where the cache miss signal includes a target address and the interpreter continues operation at the target address. A trace buffer is provided which is configured to receive and store the branch history data for the series of traces. The dynamic translator also includes a trace selector configured to receive the branch history data for the series of traces stored in the trace buffer and further configured to receive the non-native code image. The trace selector is configured to count the occurrences of each start address in the branch history data and mark as hot each start address having a count which exceeds a threshold. The trace selector then disassembles and translates the non-native code words for each hot trace into a translated code segment. A translated code cache is configured to receive and store the translated code segment for each hot trace, where the translated code cache receives the start address of the currently executing trace from the control section of the interpreter and, responsive thereto, generates the cache hit signal if a translated code segment corresponding to the start address resides in the cache and generates the cache miss signal if a translated code segment corresponding to the start address does not reside in the cache. The translated code cache returns an untranslated instruction address as the target address when execution of the translated code segment branches to the untranslated instruction address.

An embodiment of a method for dynamically disassembling an executing program, according to the present invention, includes generating a series of execution traces corresponding to executed instructions of the executing programs, where each execution trace includes a start address of the trace and a branch history value of the trace, wherein the branch history value includes a bit corresponding to each branch instruction in the trace and indicates whether the branch instruction branched to its target address or fell through to its subsequent address. The method then calls for identifying a trace for disassembly, sequentially walking through each instruction of a code image of the executing program beginning with the start address of the identified trace until a branch instruction is encountered, and checking the bit of the branch history value of the identified trace that corresponds to the branch instruction. The method then resumes walking through the code image of the executing program at the target address of the branch instruction if the corresponding bit of the branch history value indicates that the branch instruction branched to its target address, and resumes walking through the code image of the executing program at the subsequent address to the branch instruction if the corresponding bit of the branch history value indicates that the branch instruction fell through to the subsequent address.

The foregoing and other objects, features and advantages of the invention will become more readily apparent from the following detailed description of several embodiments of the invention which proceeds with reference to the accompanying drawings.

DETAILED DESCRIPTION OF THE PRESENT INVENTION

The present invention is directed towards a method for selecting active traces in an executing program for translation into a translated code cache. The strategy in the trace selection method of the present invention is to identify hot traces for translation into the translated code cache, where the traces are preferably cyclic. A "trace" is defined to be a sequence of dynamic instructions terminated by the execution of a "trace-ending" branch. The method also searches for sequences of traces which can be combined to form larger cyclic traces.

A trace-ending branch is one that satisfies any one of the following conditions: (1) it is a backward taken branch, i.e. the target address of the branch is earlier in the execution cycle than its own address; (2) it is an indirect branch where the branch target can only be determined by executing that instance of the branch, i.e. the target cannot be determined by decoding the branch instruction itself; and (3) execution of the branch causes the branch history limit for the trace to be reached. A new trace begins at the next executed address following the trace-ending branch.

An embodiment of a dynamic translator 200 according to the present invention is shown in FIG. 2. Similar to the conventional device of FIG. 1, the interpreter 230 executes the program in non-native code image 22 in memory 20 by reading words of the non-native code 22 and emulating or translating the non-native code into native code, which is then executed by the native processor.

Figure 3:
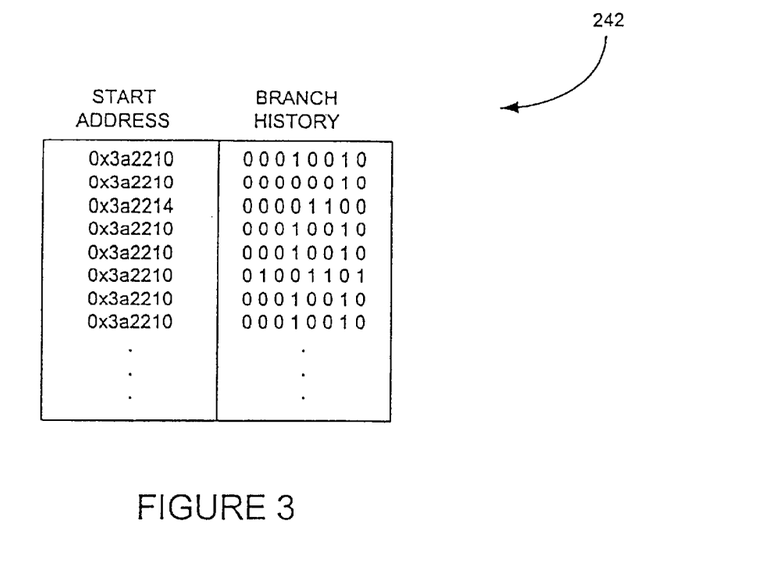
FIG. 3 illustrates an example of the contents of the trace buffer 242 of FIG. 2.

However, the interpreter 230 is adapted to emit a trace history stream corresponding to the sequence of recently emulated instructions. The trace history stream is stored in a trace buffer 242 for processing by trace selector 240. The trace stream may be encoded for efficiency reasons. The information contained in the trace history stream must allow dynamic disassembly of the instructions comprising any trace selected from the stream. FIG. 3 illustrates the trace stream by showing an example of the contents of trace buffer 242 where the trace history data takes the form of a start address paired with a branch history value.

Branch history values are the preferred form of trace history data. But there are many other ways to obtain the trace history data. One way is to instrument the executing code with instructions embedded in the program which record the execution of the instrumented code. However, instrumentation of the code can result in a code explosion which slows execution and increase overhead. Another alternative is to use statistical program count (PC) sampling. The actual program runs under control of a profiler program which acts as a wrapper around the code which is being profiled. The profiler program sets up an operating system timer to interrupt the executing program periodically in order to record the PC executing at the time of interrupt. The frequency of such sampling determines the amount of overhead involved in profiling the executing program. However, there is a trade-off between overhead and accuracy when selecting the sampling frequency.

There are also ways of using existing hardware for obtaining branch history data which can be used as trace history data, such as using existing branch prediction logic within many existing processors. See the approach of Conte, Patel and Cox, "Using Branch Handling Hardware to Support Profile-Driven Optimization", MICRO 27, November 1994.

An embodiment of an efficient mechanism to encode and sample a trace history is disclosed in commonly assigned, co-pending patent application Ser. No. 09/186,945 filed Nov. 5, 1998 entitled "METHOD AND APPARATUS FOR PROFILING OF NON-INSTRUMENTED PROGRAMS AND DYNAMIC PROCESSING OF PROFILE DATA" herein incorporated by reference for all purposes.

The co-pending application describes a mechanism to keep track of "the last executed trace", as well as a "currently executing trace" which is incomplete at the time of sampling. The operating system, or privileged software, can read the last executed trace information. The rest of the scheme is similar to conventional statistical PC sampling. The program code is run under control of a profiler program, the profiler program makes operating system calls to set up a timer interrupt, and registers an interrupt handler procedure. When a timer interrupt occurs, the operating-system invokes the handler and gives the handler the machine state and the last trace executed data at the instant of the interrupt.

The handler then records this information and any other relevant information (which may include updating a counter associated with the trace). Alternatively, the trace termination condition can be used to trigger the interrupt, or trace data can be stored in a buffer and buffer overflow triggers the interrupt. This trace collection mechanism can be implemented with a hardware assist that is inexpensive to implement and has minimal impact on processor cycle time.

Returning now to FIG. 2, the trace history stream is consumed by trace selector 240, which selects hot cyclic traces from this stream, disassembles the executed code from the non-native code image using the trace history data and translates the instructions of the hot traces into the translated code cache 250.

The trace selector 240 can be implemented as a software handler that is invoked upon overflow of the buffer 242. Alternatively, a circular buffer can be used, and a timer interrupt can periodically invoke the trace selector, which would then be implemented as a signal handler to analyze the traces in the buffer 242.

If the invocation of trace selector 240 is triggered by the overflow of trace history buffer 242, then the overhead of trace selection processing will drop to zero along with the profile overhead associated with obtaining the trace history data when control flow passes into the translated code cache 250. Otherwise, if the trace selector 240 is intermittently invoked via a timer interrupt, it can first check a flag that indicates if control is presently in the code cache 250, and return immediately if the flag is set. The disruption due to trace selector 240 invocation when control is in the translated code cache 250 will then drop to nearly zero.

Although any backward taken branch terminates a trace, this still does not guarantee that the trace is cyclic. The target of the trace-ending backward branch may not be the top of the same trace. In such cases, it is possible to stitch together consecutive traces in the stream to form a longer cyclic trace. This is accomplished by buffering the trace history stream in trace buffer 242 so that the trace selector 240 can analyze a limited window of recently emulated traces.

A control subsystem 232 of interpreter 230 monitors the execution stream for execution addresses having a translation in the translated code cache 250. When the interpreter 230 encounters a trace-ending branch whose target has a translation in the translated code cache 250, control subsystem 232 detects the cache hit on the branch target address and transfers control to the translated target code within translated code cache 250 which effectively suspends the operation of interpreter 230. Native execution by the processor then continues at the translated target, which may be the entry point of several hot traces already in the translated code cache 250.

With the interpreter 230 suspended, the trace history stream stops flowing in trace buffer 242 and the trace selector 240 also becomes dormant. Since the translated code cache 250 contains translations of mostly cyclic traces, control is likely to spin around in the cache for a while before a branch is taken to a non-translated address. When a branch to a non-translated target is encountered, a cache miss occurs in translated code cache 250 and control is transferred back to the control subsystem 232 of interpreter 230, which then resumes emulating non-native code words and producing the trace history stream. The trace selector 240 will then resume processing the trace history data in the trace buffer 242 in order to identify hot traces for translation into code cache 250.

The interpreter 230, trace selector 240 and the translated code cache 250 thus operate in a negative feedback loop.

The longer that control flow remains in the translated code stored in the translated code cache 250 and out of the interpreter 230, the less overhead is incurred in the function of the trace selector 240. The trace selector 240 will also attempt to identify cyclic hot traces for translation into the translated code cache in order to increase the likelihood that control will stay in the translated code cache 250 because much of the execution time is typically spent in loops.

Only the hot targets of trace-ending branches are allowed to be valid entry points into the translated code cache 250 from the interpreter 230. This ensures that the only place for control to enter a trace in the translated code cache is at the top of the trace; control is not allowed to jump into the middle of a trace. The reverse, however, is possible: a trace can begin in the translated code cache 250, branch off to a non-translated address, and terminate when the trace-ending branch is emulated by the interpreter 230. This creates a problem because the sequence of instructions corresponding to the translated portion of the trace (the portion in the translated code cache 250) was never inserted into the trace history stream. So if such a trace gets hot, it will not be seen by the trace selector 240. A simple solution is to start a new trace at the target address of the branch that missed in the translated code cache 250.

FIGS. 4–6, 7A and 7B are flow control diagrams which describe the function of trace selector 240 and represent an embodiment of the method of the present invention. Each time a trace is received from interpreter 230, step 410, the trace is added to the trace buffer 242, step 420. Each trace entry consists of a start address of the trace and a branch history of the trace, as illustrated in FIG. 3. Alternatively, upon exiting the cache, information about the translated portion of the most recently executed trace can be inserted into the trace history stream, prior to control transfer to the interpreter.

Figure 4:
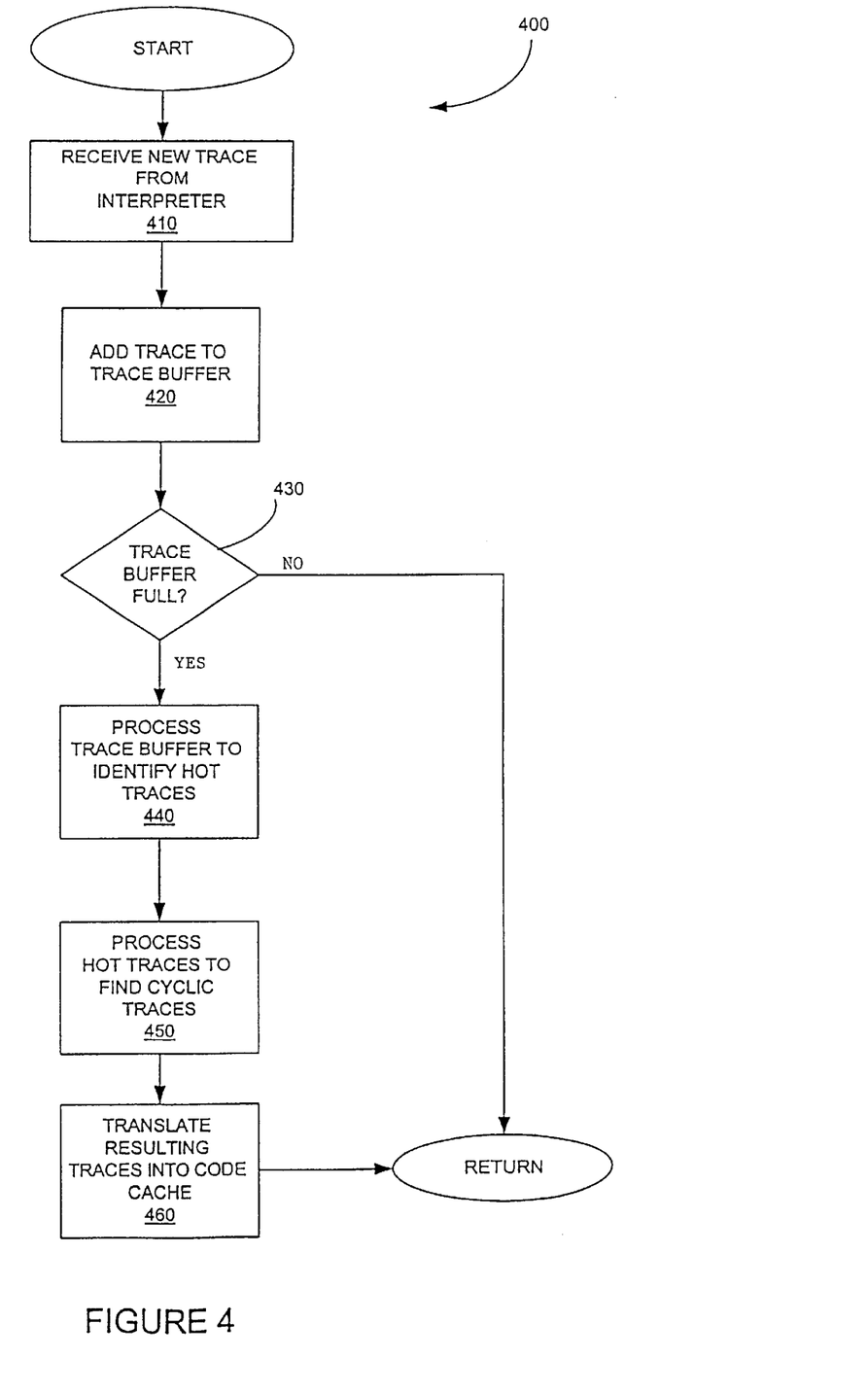
FIG. 4 is a control flow diagram of an embodiment of a routine for selecting active regions of executing code according to the present invention.

The trace buffer 242 is then checked at step 430 to see if the buffer is full. If not, then control returns to the interpreter 230, which continues with execution of the next trace. If the trace buffer 242 is full, then the trace history entries residing in the trace buffer will be processed to identify hot traces, step 440. In turn, the traces identified as hot in step 440 are processed at step 450 to identify cyclic traces. The resulting hot traces are then translated at step 460 into native binary which is stored in translated code cache 250.

Figure 5:
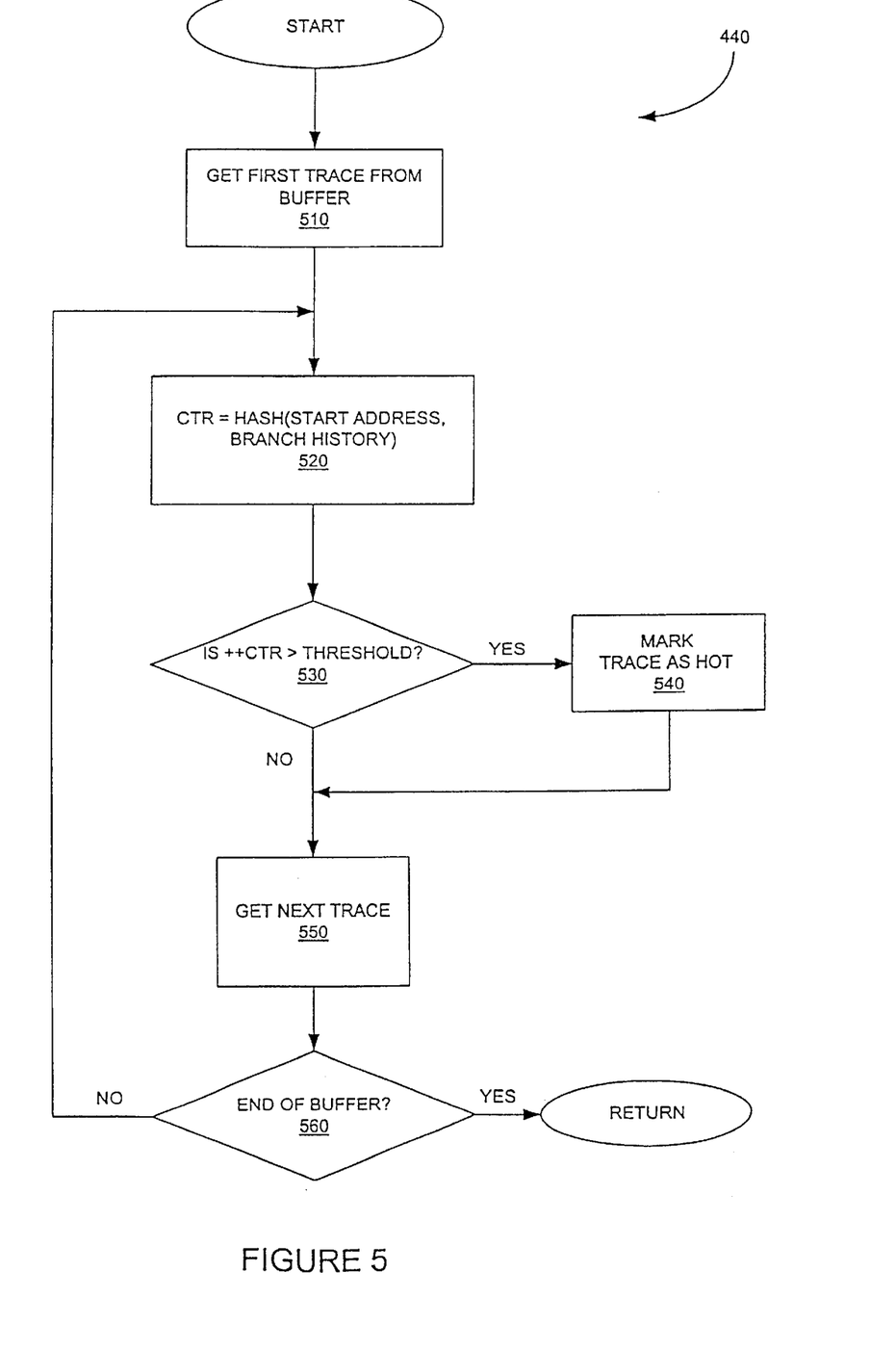
FIG. 5 is a control flow diagram showing greater detail of the step of processing a trace buffer to identify hot traces in FIG. 4.

FIG. 5 describes the processing which occurs in step 440 of FIG. 4. Processing of the trace buffer begins at step 510 by obtaining the first trace entry in trace buffer 242. A counter value CTR corresponding to a trace is obtained at step 520 by using a start address of the trace to hash into a table used to maintain data on the trace history stream. There will often be several traces having the same start address value as a root, but which have different branch history values. For example, the first two entries in trace buffer 242 in FIG. 3 have the same start address, 0x3a2210, but different branch history values. A hash function is typically used to obtain the counter CTR for the start address value. If no entry exists for the start address value, then an entry will be created.

Alternatively, step 440 can be constructed such that the region selector 240 can use a two-level hashing scheme based on the (start address, branch history) pairs to identify hot traces. The first hash is used to increment a counter associated with the start address. The second hash is used to increment a counter associated with the branch history component of the trace and has the advantage that the second is performed only when the first counter has reached the threshold indicating that the start address is hot. Because several traces can share the same start address, which is typically the target of a backward taken branch, there is a high likelihood that a hot start address is also the entry header of a hot loop. Hot traces that begin at same hot start address are thus likely to be different hot paths through the same loop, making them ideal candidates for translation into the code cache.

The CTR value is then incremented at step 530 to account for the execution of the trace represented by the entry in the trace buffer 242. Thus, the CTR value represents the number of times that the corresponding start address has been executed by interpreter 230. Several traces can have the same start address, and hence share the same CTR. If the CTR value exceeds a threshold value, then the trace is marked as hot at step 540. All traces in the trace buffer that share this CTR also become hot as a consequence. If the CTR value does not exceed the threshold or the trace has been marked hot, then control proceeds to step 550 to obtain the next trace in buffer 242. This processing proceeds through each entry in buffer 242 until the end of the buffer is indicated at step 560.

The simplest way to identify hot traces using this trace profiling technique is to trigger some action when a trace has executed at least N times. In this case, the threshold against which the CTR value is compared is a fixed value. However, there are many variations on this basic approach. For example, there can be different levels of thresholds, at which progressively more expensive actions are triggered (because at each higher threshold level, one is more confident that this is indeed a very hot trace). As a specific case, different thresholds could trigger different kinds of optimizations to be applied on the trace if it executes at least N times, N+x times, N+x+y times, etc. Another example is to not use a fixed value as the threshold, but to dynamically vary the threshold depending on another factor, such as the hit rate in the translated code cache. If the hit rate in the cache is fairly high, it could indicate that the current working set of the application has successfully been captured in the cache, and it may not be worthwhile examining any more traces. So, in this example, at high cache hit rate, the threshold is raised, in order to lower the likelihood of triggering any action on traces. If at a later point in time the cache hit rate goes too low, then the threshold is lowered, thereby increasing the likelihood of examining more traces for possible candidates for inclusion in the cache.

In the example of FIG. 3, the trace having start address 0x3a2210 and branch history 00010010 occurs frequently in trace buffer 242 and is therefore probably a hot trace. Assuming that the CTR value for start address 0x3a2210 exceeds the threshold value, the trace is marked as hot at step 540 of FIG. 5.

Figure 6:
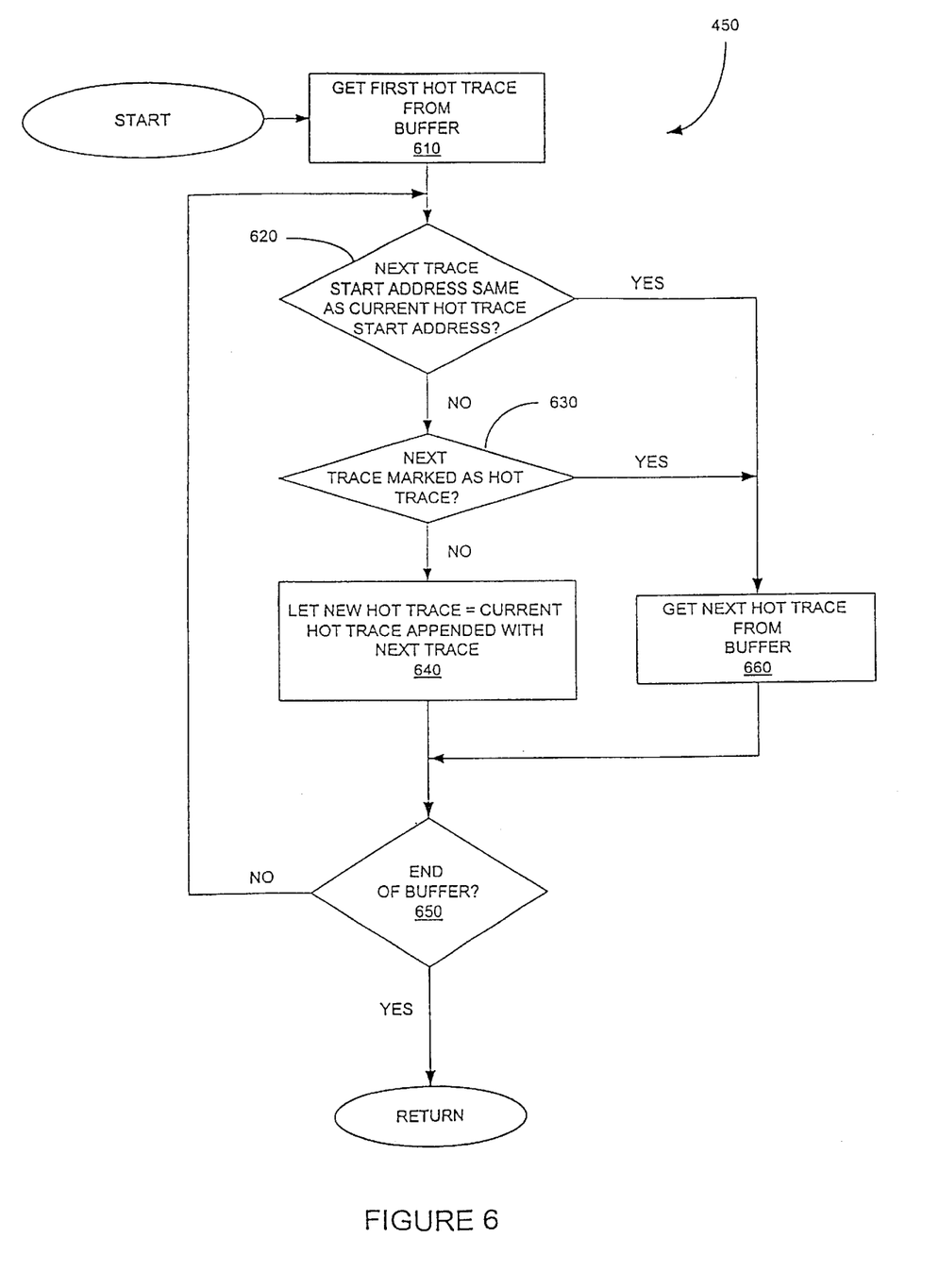
FIG. 6 is a control flow diagram showing greater detail of the step of processing hot traces to find cyclic traces in FIG. 4.

The hot traces identified in step 440 are then processed in order to identify cyclic traces at step 450, which is shown in greater detail in FIG. 6. Processing for cyclic traces begins at step 610 by retrieving the first trace from trace buffer 242 that was marked as hot in step 440 of FIG. 4. This first trace is the current trace under consideration. The next trace in the buffer is then retrieved at step 620 and the start address of the next trace is compared to the start address of the current hot trace.

If the start addresses of the current hot trace and the next trace are the same, then the traces share the same root and the traces are marked as cyclic at step 620 for later processing. Processing will therefore move on to step 660 to get the next hot trace in trace buffer 242.

If the next trace does not have the same start address, then the next trace is checked at step 630 to see if it is marked as hot. If the next trace is hot, then processing moves on to get the next hot trace at step 660.

If the next trace is not marked as hot, then processing proceeds to step 640 where the next trace is checked to see if it is a candidate for "companding" with the current hot trace. In companding the two traces are combined into a single trace. The two traces can be companded because the next trace is the target of the trace terminating condition of the current hot trace. Therefore, the execution sequence represented by the two traces must have started with the current hot trace and continued with the next trace.

Companding is the stitching together of traces to try to create cyclic traces. In the particular embodiment detailed here, companding is performed by appending the branch history value of the next trace to the branch history value of the current hot trace. The result is a single trace with a longer branch history value representing the behavior of a larger segment of the code. Processing then returns to step 620 to obtain the next trace in the trace buffer. If the next trace has the same start address as the current hot trace, then, through companding, another cyclic trace has been identified.

This process of companding to form a branch history for a larger cyclic trace can continue to combine multiple traces in order to obtain a cyclic trace. In the example of FIG. 3, the second trace in buffer 242 has a hot start address 0x3a2210 and is followed by the third trace having start address 0x3a2214 which is not a hot start address. The fourth trace has the start address 0x3a2210. Therefore, the branch histories of the second and third traces can be companded to identify another cycle in the control flow.

The companding algorithm described above proceeds greedily onto the next trace without examining to see if the result will indeed produce a cyclic trace. Other algorithms could be used to improve the chances that companding will create a cyclic trace.

When the end of the buffer 242 is reached at step 650, then step 450 is complete. At this point, the cyclic hot traces in buffer 242 must be disassembled and translated for storage in translated code cache 250. Processing then moves on to step 460 of FIG. 4.

At step 460, each of the hot traces are disassembled by stepping thorough non-native code image 22 along with the branch history value. Beginning with the start address of the hot trace, the non-native code image is walked through sequentially until a branch instruction is encountered, and each instruction in this walk is translated into native code that is stored in translated code cache 250.

In doing this translation, when a branch instruction is encountered, the corresponding branch history is used to determine whether the branch instruction was taken or not. If the branch history indicates that the branch was taken, then the sense of the translated branch is flipped: the taken branch instruction is translated into a replacement branch which branches when the inverse of the original branch condition occurs and the target of the replacement branch becomes the next instruction in the non-native code sequence. This process is continued until the trace terminating condition of the trace is encountered.

The result is that the instructions in the translated hot trace are laid out sequentially in the translated code cache 250. If the target of a branch is not resident in the translated code cache 250, then the branch is directed to a trampoline code sequence which transfers control back to the interpreter 230.

Figure 7A:
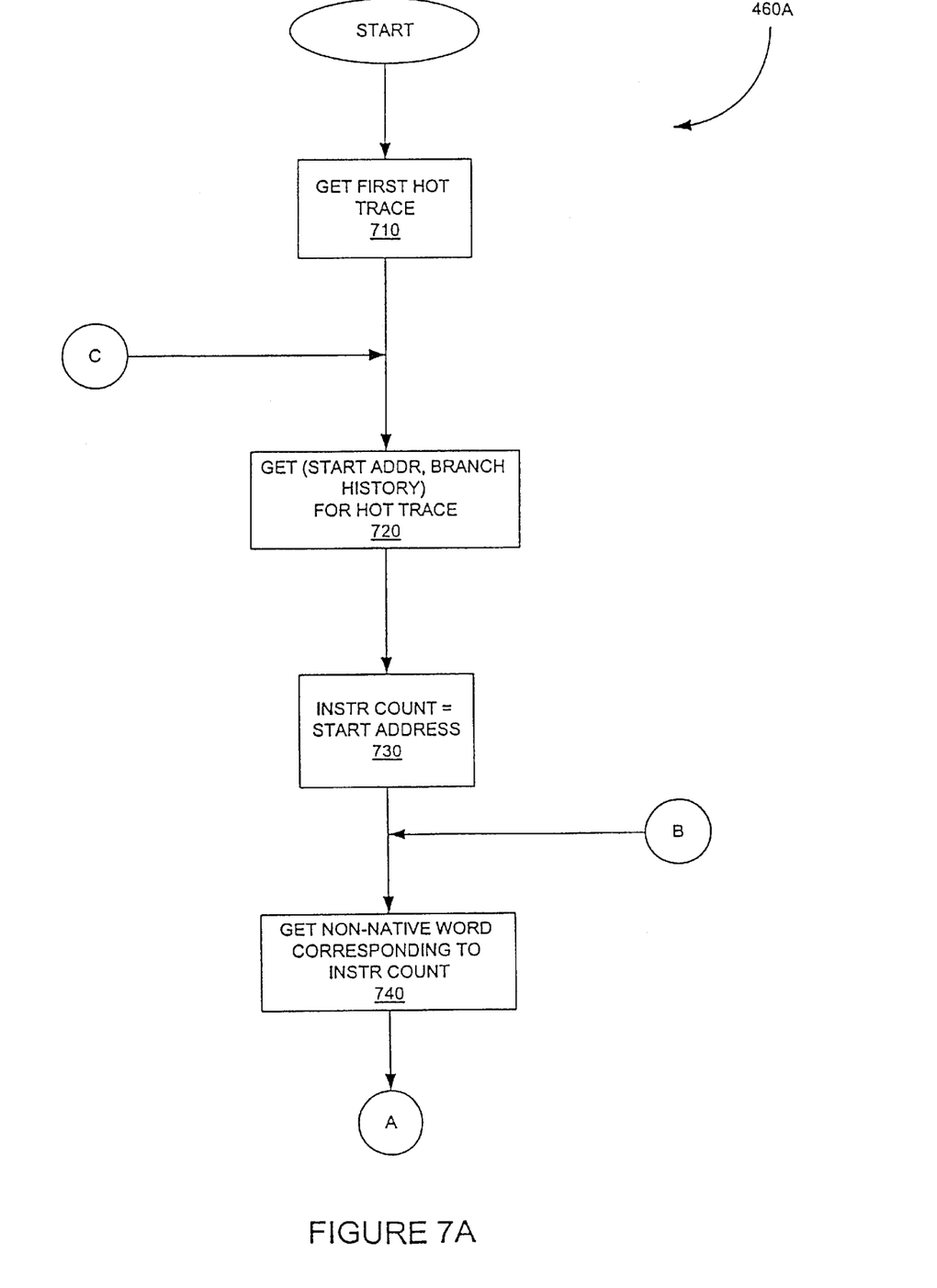
FIGS. 7A and 7B are control flow diagrams showing greater detail of the step of translating resulting traces into code cache in FIG. 4.
Figure 7B:
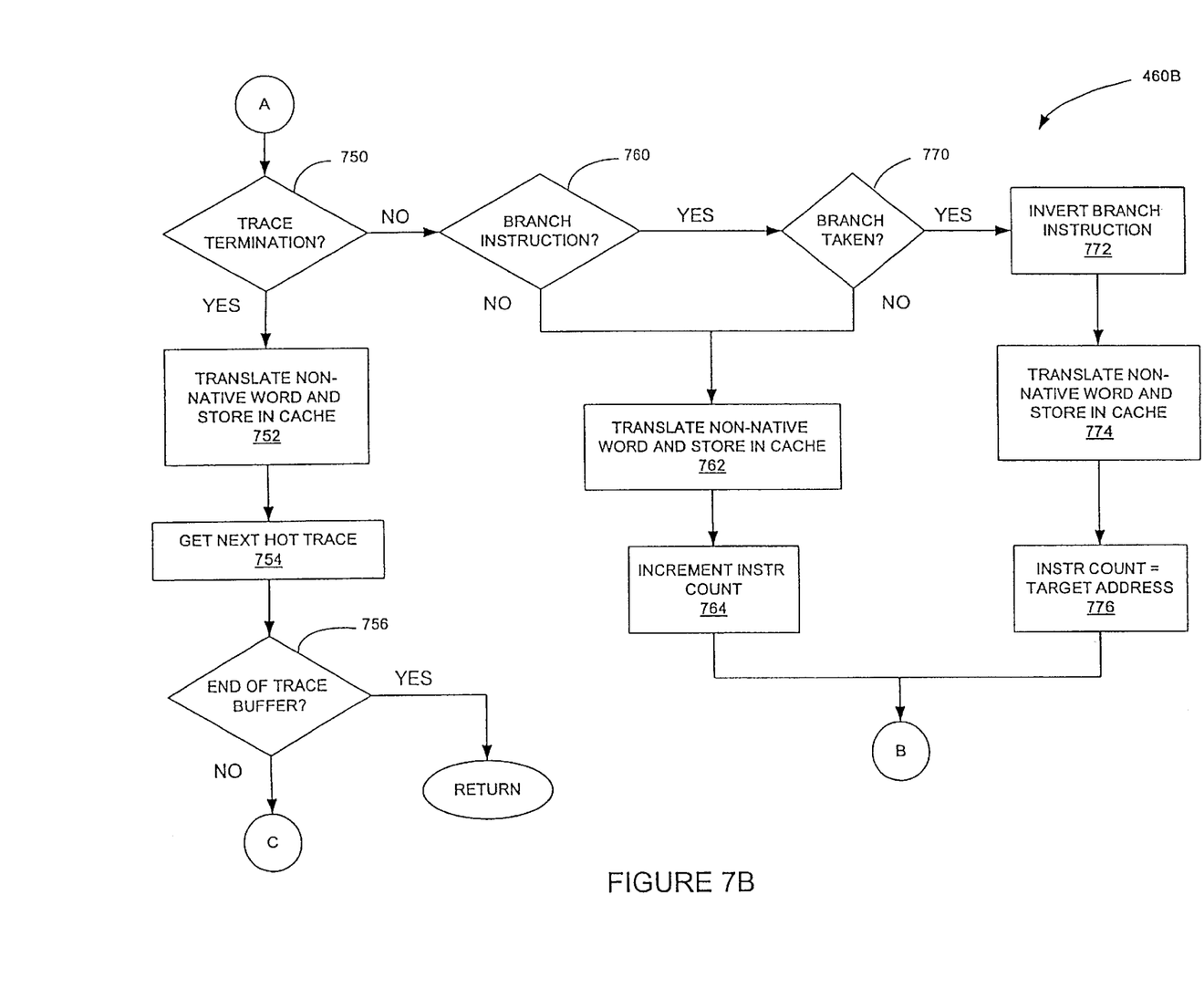

FIGS. 7A and 7B are flow diagrams illustrating an embodiment of step 460 of FIG. 4. Processing starts with by getting the first hot trace identified in trace buffer 242 at step 710 of FIG. 7A. The branch history for the trace is retrieved at step 720. An instruction count (INSTR COUNT) value is set to the start address of the hot trace at step 730. Then, the non-native word corresponding to the INSTR COUNT is retrieved from the non-native code image 22 at step 740.

Processing now proceeds to step 750 of FIG. 7B. If the non-native code word corresponds to the trace termination condition which terminated the hot trace, then the non-native code word is translated and stored in cache 250, at step 752, and the next hot trace is retrieved from buffer 242, at step 754. If there are no more hot traces remaining in the buffer, then step 460 is complete and control branches at step 756 to the end of the routine for step 460. If there are remaining hot traces, then processing proceeds at step 756 back to step 720 for processing of the next hot trace.

If the non-native code word retrieved at step 740 did not cause the trace termination condition, then control proceeds from step 750 to step 760 where the non-native code word is checked to see if it is a branch instruction. If this is not a branch instruction, then control flows from step 760 to step 762, where the non-native code word is translated into a native code word that is stored in cache 250, and step 764, where the INST COUNT value is incremented in order to access the next instruction in the code sequence in the non-native code image 22. Control then returns to step 740 where the next code word is retrieved for processing.

If the non-native code word is a branch instruction, then processing proceeds from step 760 to step 770 where the branch history value is examined to determine whether the branch was taken or not taken during execution of the trace. This is determined by looking at the bit in the branch history value corresponding to the branch instruction under consideration.

Figure 8:
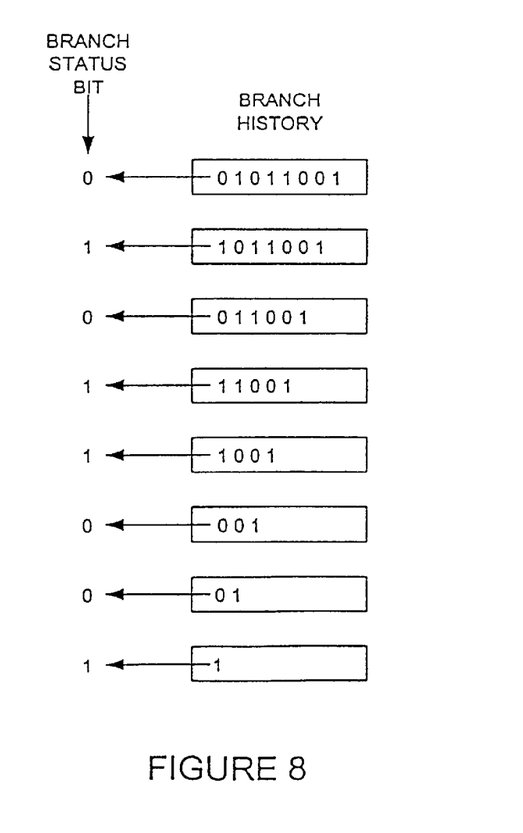
FIG. 8 is a data diagram illustrating an example of how the branch history data of FIG. 3 is used for disassembly of a trace.

An example of the use of the branch history during disassembly is illustrated in FIG. 8. A branch history value 01011001 is shifted such that the first valid bit of the branch history is in the most significant bit (MSB) position. The branch history value includes a marker bit, such as a leading '1', which is used to demarcate the boundary between the valid history bits and invalid bits left over from initialization. Once the marker bit is shifted out from the MSB position, the remaining bits are valid branch history data.

As each branch instruction is encountered during processing in step 460, the branch status bit for the branch instruction is consumed and the branch history is shifted so that the next branch status bit resides in the MSB. This continues until the branch history is completely consumed. Thus, the branch status bits 0, 1, 0, 1, 1, 0, 0, and 1 are sequentially consumed during disassembly until no bits remain. The remaining instructions in the trace are all non-branch instructions leading up to the trace termination condition.

If the branch status bit for the branch instruction is a '0', then the branch was not taken during execution of the trace and processing proceeds to step 762. At step 762, the target address of the branch instruction must be checked for a corresponding translation in the translated code cache 250. If the target address has been translated, then the branch instruction will be translated with the address in cache 250 for the translated target address. If the target address has not been translated, then the branch will be translated to a jump to a trampoline code segment which will return control to the control section 232 of interpreter 230 along with the untranslated target address for continued execution in the non-native code image 22.

If the branch status bit is a '1', then the branch was taken during execution of the trace and processing proceeds to step 772 where the branch instruction is inverted. The branch is inverted by inverting the branch condition and swapping the target address with the next instruction in the sequence of the original code image 22. The object of inverting the branch is to make the original target of the branch in the non-native code sequence, which was executed in the trace, become the next code in sequence within the corresponding translated code segment stored in translated code cache 250. Thus, the next instruction in sequence in the non-native code image 22 becomes the target of the inverted branch instruction. The inverted branch instruction is then translated and stored in cache 250 at step 774 and the INSTR COUNT is set to the target address of the original branch instruction at step 776. Processing then returns to step 740 of FIG. 7A to retrieve the non-native code word of the target address. The result is that the code words in the translated segment of code in cache 250 corresponding to the trace are laid out in sequence of actual execution.

Processing of a non-native code trace 22 is demonstrated in FIG. 9 using the example of the trace buffer contents shown in FIG. 3. The first trace in trace buffer 242 in FIG. 3 has a start address 0x3a2210 and branch history 00010010. The repetition of the start address in the other entries in buffer 242 causes the CTR value for the start address to exceed the hot trace threshold and the trace is marked as hot. Thus, the trace will be disassembled and translated into a translated code segment stored in translated code cache 250.

It should be noted that, in general, the structure of the translated code for a trace will be different from the structure of the original code image. Rarely will there be a one-to-one correspondence between a line of the original code image and the translation in the code cache. There may be a one-to-many or many-to-one relationship between the original code words and the translated code words. Translation will also depend on such factors as register availability in the host processor (e.g. some stores/loads to memory may have to be inserted into the translated trace if there are not enough registers available). Thus, a translation of an original code image, such as TRINST1 or TRBRCH3 below, may be a sequence of native binary code words.

Also, each of the branch instructions which transfer control back to the interpreter, such as TRBRCH3 (0x3a2224) below, can be a sequence of instructions that returns control to the control section 232 of interpreter 230 and communicates to the interpreter the next non-native instruction address, i.e. 0x3a2224, at which to resume execution through interpretation. Communication of the next non-native instruction address can be accomplished in many ways, such as through a reserved memory location or register within the native processor.

Figure 9A:
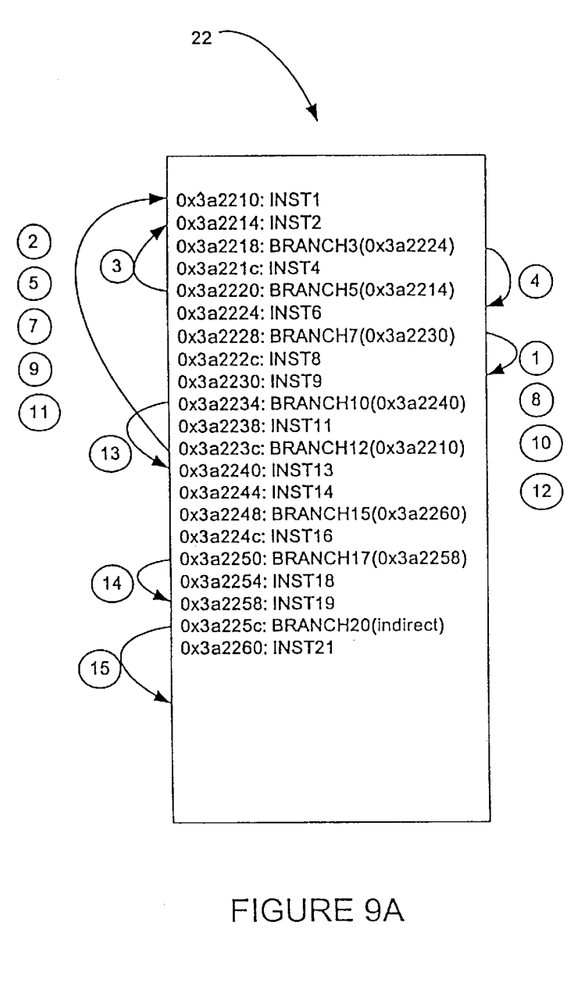
FIG. 9A is an example of the contents of the non-native program code image in the memory of FIG. 2 which corresponds to the contents of the trace buffer of FIG. 3.

The code segment of non-native code image 22 corresponding to the first trace entry is shown at the top of the code image 22 in FIG. 9A. Disassembly and translation starts with INST1 at address 0x3a2210 and proceeds sequentially through the non-native code image 22 until a branch instruction is encountered. Thus, the translated code cache 250 in FIG. 9B has a segment starting with a translation of INST1 (TRINST1) which is associated with a cache address tag for address 0x3a2210 and is followed by the translation of INST2 (TRINST2).

Figure 9B:
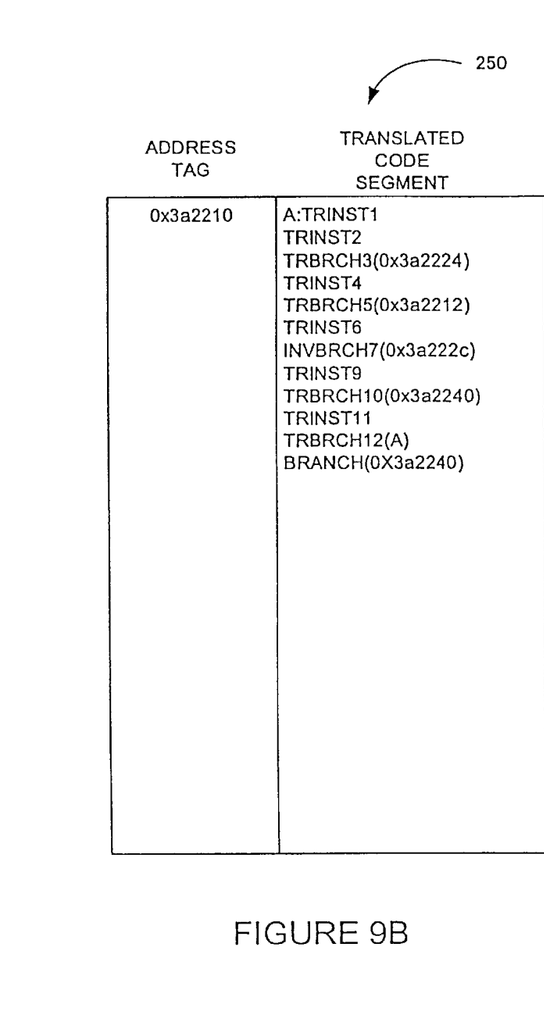
FIGS. 9B, 9C, and 9D illustrate the contents of the translated code cache of FIG. 2 as the contents of the trace buffer of FIG. 3 is used to translate the non-native program code image of FIG. 9A.

The third instruction encountered is a branch instruction BRANCH3. This is the first branch in the trace and the branch status bit corresponding to BRANCH3 is the most significant bit following the marker bit, i.e. the leading '1'. The next most significant bit in this example is a '0'. Thus, BRANCH3 was not taken in the hot trace and the branch is translated with its original target address into translated code TRBRCH3(0x3a2224) which is then stored in cache 250.

Similarly, disassembly and translation proceeds sequentially to INST4, translated to TRINST4, and then to BRANCH5. The next branch status bit of the branch history value for the trace is a '0' indicating that BRANCH5 did not branch to its target address 0x3a2212, so the branch is translated as TRBRCH5(0x3a2212).

Disassembly and translation then proceeds sequentially to INST6, translated to TRINST6, and then to BRANCH7. The next branch status bit of the branch history value for the trace is a '1' indicating that BRANCH7 branched to its target address 0x3a2230, which corresponds to INST9. Therefore, BRANCH7 is inverted and the target of the inverted branch is the next instruction in the original non-native code image sequence 0x3a222c, which corresponds to INST8. The resulting translation is represented in FIG. 9B by INVBRCH7(0x3a222c).

BRANCH7 branched to INST9 and therefore the next instruction following INVBRCH7 is TRINST9. Thus, when execution flow follows the same path, INVBRCH7 will fall through and TRINST9 will be executed.

The branch status bit of the branch history value for the trace which corresponds to BRANCH10 is a '0' indicating that the branch instruction did not branch to its target address 0x3a2240, so the branch is translated as TRBRCH10 (0x3a2240). The next executed instruction is INST11 which is translated to TRINST11.

Disassembly and translation now reaches BRANCH12 which is the instruction that triggered the termination of the trace and, in the case shown, is a backward branch to INST1. INST1 has been translated and is resident in the cache 250 at label A. Thus, BRANCH12 is translated as TRBRCH12 (A) which, when the normal branch condition is encountered in execution flow, will branch back to TRINST1 and execution remains within the translated code cache 250. If the branch condition is different, then control flow returns to the interpreter 230 and execution resumes at INST13 of the original code image. Thus, TRBRCH12(A) is followed by an unconditional branch to the address of INST13 which is BRANCH(0x3a2240).

The next trace shown in trace buffer 242 in FIG. 3 is (0x3a2210, 00000010). The start address 0x3a2210 is hot by virtue of the number of branch history entries having the start address 0x3a2210. Using the branch history value 00000010 for the second trace, the second trace executes INST1 and INST2, falls through at BRANCH3, executes INST4 and, in a departure from the first trace, terminates with a backward branch at BRANCH5 to INST2.

Figure 9C:
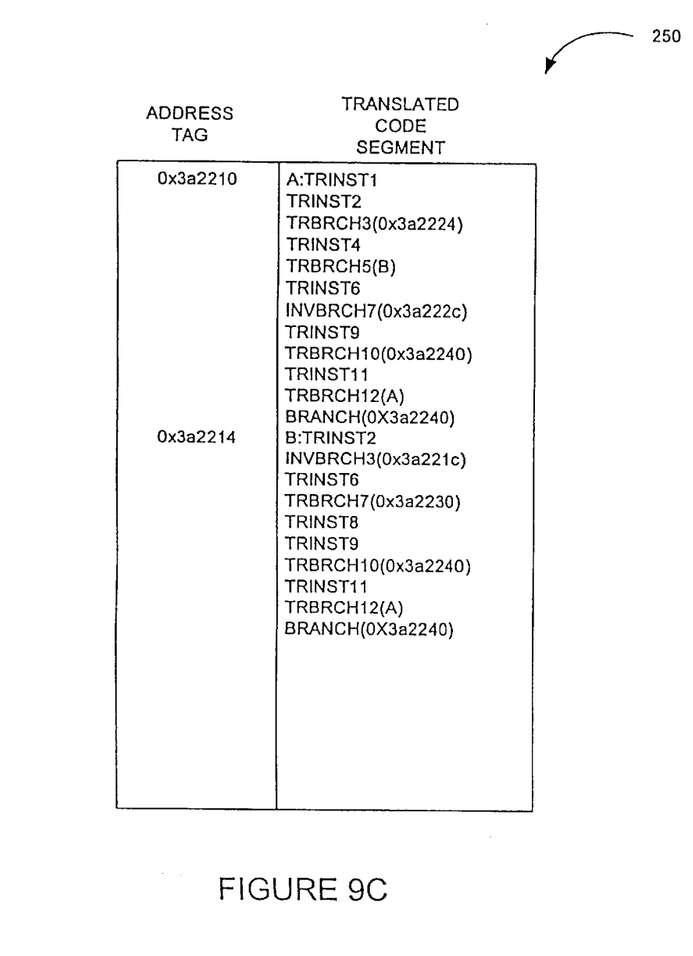

The trace (0x3a2210, 00000010) is followed in the branch history buffer 242 by the trace (0x3a2214, 00001100) which is, in turn, followed by the trace (0x3a2210, 00010010). Trace (0x3a2210, 00000010) started at the same start address as the trace already resident in translated code cache 250 but diverted from the control flow of the previous trace and, when it terminated, branched to trace (0x3a2214, 00001100). When trace (0x3a2214, 00001100) terminated, it branched back to start address 0x3a2210. Therefore, trace (0x3a2210, 00000010) can be companded with trace (0x3a2214, 00001100) to form a larger cyclic trace having the start address 0x3a2210 by appending the branch history values of the two traces. The resulting companded trace therefore looks like (0x3a2210, 00010100).

The companded trace is then disassembled and translated. INST1 is already translated in code cache 250 and has the address tag 0x3a2210 which results in a cache hit when the interpreter control section 232 encounters the address. Disassembly continues through TRINST2 to TRBRCH3, which takes the same branch direction in the companded trace as in the first translated trace and therefore remains unchanged, through TRINST4 to TRBRCH5. The target of TRBRCH5, INST2, will be translated again into code cache 250 as B:TRINST2, which has the address tag value 0x3a2214. TRBRCH5 is updated to have the translated target "B" of the second translation of INST2 so that execution flow remains within the code cache.

As disassembly of the companded trace continues, BRANCH3 is encountered again and the corresponding status bit of the branch history value indicates that BRANCH3, in this trace, jumped to its target address. Thus, BRANCH3 is inverted and the target address is changed to point to the next instruction in the sequence of the original code image 22, which results in INVBRCH3(0x3a221c).

The trace continues to be disassembled resulting in the sequence TRINST6, TRBRCH7, TRINST8, TRINST9, TRBRCH10 and TRINST11 until BRANCH12 is encountered which terminates the trace. Similar to the way that the first translated trace was disassembled, since BRANCH12 jumps to an entry point for a trace that is resident in cache, the branch is translated with the label for the resident entry point, i.e. TRBRCH12(A), and is followed by an unconditional branch back to the original code image 22, i.e. BRANCH(0x3a2240).

Figure 9D:
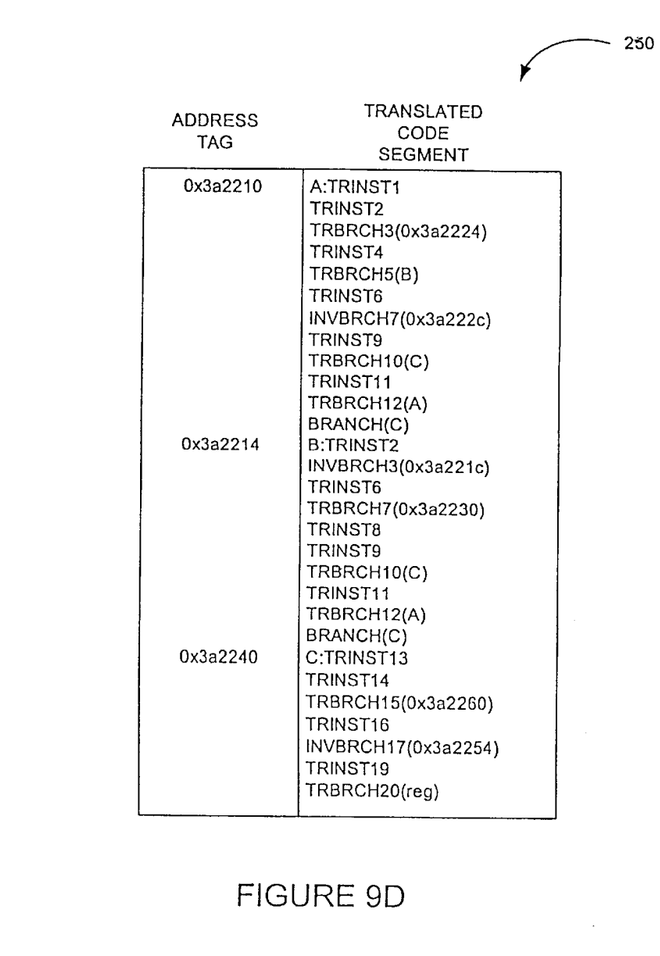

The next trace in the sequence in trace buffer 242 is (0x3a2210, 01001101). This trace has a hot start address which it shares with the traces that have already been translated into code cache 250. Therefore, disassembly proceeds at the entry point for 0x3a2210 of the code already resident in the translated code 250. The execution of this trace follows the code already resident until BRANCH10 is encountered where the control flow of the trace diverges from the previous traces. The target of BRANCH10, INST13, is translated and stored in the code cache with the label "C". Thus, the target of TRBRNCH10 is modified to branch to "C". The other references to the address 0x3a2240 for INST13 are also modified to point to "C", i.e. BRANCH (C), so that control flow remains within the code cache 250.

The rest of the trace is translated in a manner similar to the disassembly detailed above until BRANCH20 is encountered. BRANCH20 is an indirect branch which terminates the trace. The target of the indirect branch is typically determined by the value of a register. Thus, control returns to interpreter 230 for execution based upon the register value, i.e. TRBRCH20(reg).

As a result of the disassembly and translation above, when execution flow subsequently returns to address 0x3a2210, there will be a cache hit in translated code cache 250 of FIG. 2. The control section 232 of interpreter 230 receives a cache hit indication and transfers control to the cache 250 for native processor execution directly from the cache. Execution flow will remain within the translated code in cache 250 until control branches to an untranslated address, at which point a cache miss will occur and control will return to the interpreter 230.

One advantage of the present invention is that the overhead of emulation and trace selection automatically drops as the dynamic hit rate in the translated code cache increases. In addition, region selection in the present invention is focused on identifying cyclic regions for translation and storage in the code cache so that once control flow enters a translated region in cache, execution flow tends to remain within the region for a substantial period of time before exiting it, thereby increasing the dynamic hit rate in the translated code cache.

The SELF system described above generates unoptimized native code for a procedure upon first invocation using a procedure prologue containing instrumentation to count the number of invocations. If a counter exceeds a threshold, dynamic re-optimization of the procedure and possibly other procedures in the call-chain is triggered. It is difficult to differentiate between hot routines that are invoked in an intermittent manner from those that are invoked in a more clustered manner and which therefore provide greater potential for performance gain through optimization. To resolve this, SELF implements an exponential decay technique that periodically halves the counters in an attempt to convert the counters to be measures of invocation rates rather than invocation counts.

In contrast, with the present invention, it is not necessary to periodically interrupt the system in order to modify the counters. Instead, the hit rate in the translated code cache 250, which contains the current hot region, is implicitly used as the indicator for triggering appropriate action. The "appropriate action" in our case is to profile the program when the hit rate in the translated code cache decreases, but could just as easily be dynamic re-optimization of the code in the translated code cache when the hit rate is high. The present invention permits the system to avoid profiling the executing program when it is executing within a hot region that is already resident the translated code cache 250; counters related to execution are updated only when execution takes place in the interpreter 230.

Since the present invention essentially shuts off profiling when a translated trace is entered, the overhead for profiling the code is essentially zero so long as control stays within the translated trace in cache 250. Thus, the more time the application spends in the translated code cache, the less time it spends profiling. When control goes back to the interpreter 230, the profiling mechanism kicks in automatically. In this way, the translated code cache 250 and the trace selector 240 operate in a negative feedback loop: the overhead of profiling and region selection is inversely proportional to the hit rate in the translated code cache 250. Moreover, the traces selected for translation by trace selector 240 are likely to be cyclic, which increases the chances that control will iterate within the translated trace once execution enters translated code cache 250. This helps increase the dynamic hit rate in the translated code cache 250, which in turn further lowers the profiling overhead.

Another advantage of dynamically translating the trace history information in this manner is that if a trace proceeds through multiple dynamically linked procedures, then disassembly is still possible because the dynamic target addresses are present in the binary image of the code. This is difficult or impossible to do in post run-time disassembly because the dynamic address data may be lost once the process terminates and the linkages will likely be entirely different when the code is next executed.

Yet another advantage to the present invention is that it allows the execution time of program code to be reduced while the program is running. Program execution can be improved through runtime generation of optimized code for traces, based upon the runtime characteristics of the code, which are transferred into a code cache maintained separately from the program code.

Having described and illustrated the principles of the invention in a preferred embodiment thereof, it should be apparent that the invention can be modified in arrangement and detail without departing from such principles. For instance, though the present invention is described above in the context of a dynamic translator, the present invention may be applied to other applications, such as a dynamic optimizer where native program binary code can be optimized to improve performance, for which it is useful to identify hot traces and form cyclic traces. Also, rather than translation or optimization, the identification of hot traces may be used to trigger other types of events, such as trapping to a debugger or other tool; or, the user might want to use hot traces to trigger the collection of statistics relating to execution of the program. Furthermore, although the present invention is described in the context of a software implementation, it will be understood by those of ordinary skill in the art that all or parts of the invention can be implemented in hardware. I claim all modifications and variations coming within the spirit and scope of the following claims.

What is claimed is:

1. A dynamic translator for executing a non-native program, the translator comprising:

an interpreter configured to receive non-native code words from a non-native code image of the non-native program and interpret the non-native code words into corresponding native code words, wherein the interpreter is configured to generate branch history data for each of a series of traces during execution of the non-native program;

a trace buffer configured to receive and store the branch history data for the series of traces;

a trace selector configured to receive the branch history data for the series of traces stored in the trace buffer and to use the received branch history data to identify hot traces, and is further configured to receive the non-native code image and to disassemble and translate the non-native code words for each hot trace into a translated code segment, wherein the branch history data includes a start address and a branch history value and wherein the trace selector is configured to count occurrences of one of (i) the start address and (ii) a combination of the start address and corresponding branch history value, and the trace selector is configured to mark as hot those traces corresponding to a count that exceeds a threshold, and wherein the trace selector is further configured to search for first and second traces in the series of traces having the same start address value which is marked as hot and where there are intervening traces which do not have the same start address value an the first and second traces and where the start address of the intervening traces are not marked as hot, where the trace selector is further configured to compand the intervening traces with the first trace to form a cyclic trace, and wherein the trace selector disassembles each hot trace by sequentially walking through the non-native code image beginning with the start address of the hot trace and translating each non-native code word into the translated code segment for the hot trace until a branch instruction is encountered whereupon a bit of the branch history value of the hot trace corresponding to the branch instruction is checked and, if the corresponding bit indicates that the branch was taken, then the branch instruction is inverted, the branch instruction is translated into the translated code segment and disassembly resumes at the target address of the branch instruction, and, if the corresponding bit indicates that the branch was not taken, the branch instruction is translated into the translated code segment and disassembly resumes with the next instruction in the sequence of the non-native code image; and a translated code cache configured to receive and store the translated code segment for each hot trace.

2. The dynamic translator of claim 1:

wherein the interpreter further includes a control section configured to output the start address of a currently executing trace and receive a cache hit signal and a cache miss signal, and wherein the control section suspends operation of the interpreter responsive to the cache hit signal and continues operation of the interpreter responsive to the cache miss signal; and wherein the translated code cache receives the start address of the currently executing trace from the control section of the interpreter and, responsive thereto, generates the cache hit signal if a translated code segment corresponding to the start address resides in the cache and generates the cache miss signal if a translated code segment corresponding to the start address does not reside in the cache.

3. The dynamic translator of claim 2 wherein the translated code cache returns an untranslated instruction address as the target address when execution of the translated code segment branches to the untranslated instruction address.

4. The dynamic translator of claim 1, wherein the trace selector is further configured to search for first and second traces in the series of traces having the same start address value which is marked as hot and where there are intervening traces which do not have the same start address value as the first and second traces and where the start address of the intervening traces are not marked as hot, where the trace selector is further configured to compand the intervening traces with the first trace to form a cyclic trace.

5. The dynamic translator of claim 1, wherein the trace selector disassembles each hot trace by sequentially walking through the non-native code image beginning with the start address of the hot trace and translating each non-native code word into the translated code segment for the hot trace until a branch instruction is encountered whereupon a bit of the branch history value of the hot trace corresponding to the branch instruction is checked and, if the corresponding bit indicates that the branch was taken, then the branch instruction is inverted, the branch instruction is translated into the translated code segment and disassembly resumes at the target address of the branch instruction, and, if the corresponding bit indicates that the branch was not taken, the branch instruction is translated into the translated code segment and disassembly resumes with the next instruction in the sequence of the non-native code image.

6. A dynamic translator for executing a non-native program, the translator comprising:

an interpreter configured to receive non-native code words from a non-native code image of the non-native program and interpret the non-native code words into corresponding native code words, wherein the interpreter is configured to generate branch history data for each of a series of traces during execution of the non-native program;

a trace buffer configured to receive and store the branch history data for the series of traces;

a trace selector configured to receive the branch history data for the series of traces stored in the trace buffer and to use the received branch history data to identify hot traces, and is further configured to receive the non-native code image and to disassemble and translate the non-native code words for each hot trace into a translated code segment, wherein the trace selector disassembles each hot trace by sequentially walking through the non-native code image beginning with the start address of the hot trace and translating each non-native code word into the translated code segment for the hot trace until a branch instruction is encountered whereupon a bit of the branch history value of the hot trace corresponding to the branch instruction is checked and, if the corresponding bit indicates that the branch was taken, then the branch instruction is inverted, the branch instruction is translated into the translated code segment and disassembly resumes at the target address of the branch instruction, and, if the corresponding bit indicates that the branch was not taken, the branch instruction is translated into the translated code segment and disassembly resumes with the next instruction in the sequence of the non-native code image; and a translated code cache configured to receive and store the translated code segment for each hot trace.

7. The dynamic translator of claim 6, wherein the branch history data includes a start address and a branch history value and wherein the trace selector is configured to count occurrences of one of (i) the start address and (ii) a combination of the start address and corresponding branch history value, and the trace selector is configured to mark as hot those traces corresponding to a count that exceeds a threshold.

8. The dynamic translator of claim 6:

wherein the interpreter further includes a control section configured to output the start address of a currently executing trace and receive a cache hit signal and a cache miss signal, and wherein the control section suspends operation of the interpreter responsive to the cache hit signal and continues operation of the interpreter responsive to the cache miss signal; and wherein the translated code cache receives the start address of the currently executing trace from the control section of the interpreter and, responsive thereto, generates the cache hit signal if a translated code segment corresponding to the start address resides in the cache and generates the cache miss signal if a translated code segment corresponding to the start address does not reside in the cache.

9. The dynamic translator of claim 8 wherein the translated code cache returns an untranslated instruction address as the target address when execution of the translated code segment branches to the untranslated instruction address.

10. The dynamic translator of claim 6, wherein the trace selector is further configured to search for first and second traces in the series of traces having the same start address value which is marked as hot and where there are intervening traces which do not have the same start address value as the first and second traces and where the start address of the intervening traces are not marked as hot, where the trace selector is further configured to compand the intervening traces with the first trace to form a cyclic trace.

* * * * *